United States Patent
Warren

(10) Patent No.: US 9,888,266 B2
(45) Date of Patent: Feb. 6, 2018

(54) PUSHING VIDEO TO PANELS AND SENDING METADATA TAG TO CLOUD

(71) Applicant: Vivint, Inc., Provo, UT (US)

(72) Inventor: Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 233 days.

(21) Appl. No.: 14/258,568

(22) Filed: Apr. 22, 2014

(65) Prior Publication Data

US 2015/0304689 A1 Oct. 22, 2015

(51) Int. Cl.
| | |
|---|---|
| *H04N 7/173* | (2011.01) |
| *H04N 21/231* | (2011.01) |
| *H04N 21/218* | (2011.01) |
| *H04N 21/436* | (2011.01) |
| *H04N 21/472* | (2011.01) |
| *H04N 21/422* | (2011.01) |
| *H04N 21/442* | (2011.01) |
| *H04N 21/84* | (2011.01) |

(52) U.S. Cl.
CPC ....... *H04N 21/231* (2013.01); *H04N 21/2181* (2013.01); *H04N 21/42202* (2013.01); *H04N 21/43615* (2013.01); *H04N 21/44231* (2013.01); *H04N 21/47202* (2013.01); *H04N 21/84* (2013.01)

(58) Field of Classification Search
CPC ............. H04N 21/231; H04N 21/2181; H04N 21/43615; H04N 21/47202; H04N 21/42202; H04N 21/44231; H04N 21/84
See application file for complete search history.

(56) References Cited

U.S. PATENT DOCUMENTS

| | | | |
|---|---|---|---|
| 2005/0021915 A1 | 1/2005 | Lowe et al. | |
| 2007/0143804 A1* | 6/2007 | Wang | H04N 7/17318 725/95 |
| 2010/0205203 A1* | 8/2010 | Anderson | G06F 17/3079 707/769 |
| 2011/0050947 A1 | 3/2011 | Marman et al. | |
| 2013/0147623 A1 | 6/2013 | Somasundaram et al. | |
| 2013/0166711 A1 | 6/2013 | Wang et al. | |
| 2013/0254163 A1 | 9/2013 | Savage et al. | |
| 2013/0290284 A1 | 10/2013 | Knapp et al. | |
| 2014/0023340 A1 | 1/2014 | Civiletto et al. | |

(Continued)

OTHER PUBLICATIONS

International Search Report and Written Opinion of the International Searching Authority for PCT/US2015/024836, dated Jun. 22, 2015.

(Continued)

*Primary Examiner* — John Schnurr
(74) *Attorney, Agent, or Firm* — Holland & Hart LLP

(57) ABSTRACT

Methods and systems are described for storing and accessing video content collected by a home automation system. According to at least one embodiment, an apparatus for accessing video content collected by a home automation system includes a processor, a memory in electronic communication with the processor, and instructions stored in the memory which are executable by a processor to receive metadata about a recorded event from a cloud storage, request video content of the recorded event based on the metadata, and receive at least some of the video content from a controller of the home automation system.

17 Claims, 11 Drawing Sheets

(56) References Cited

U.S. PATENT DOCUMENTS

2014/0085501 A1 3/2014 Tran
2015/0097949 A1* 4/2015 Ure .................. G08B 5/223
348/143

OTHER PUBLICATIONS

Supplementary European Search Report for EP Application No. 15783350, dated Oct. 17, 2017 (3 pp).

* cited by examiner

PUSHING VIDEO TO PANELS AND SENDING METADATA TAG TO CLOUD

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, challenges exist in communicating with, integrating, and controlling the various components. Additional challenges relate to storing and accessing the voluminous digital data that is collected and exchanged during operation of home automation and security systems.

SUMMARY

Methods and systems are described for storing and accessing video content collected by a home automation system. According to at least one embodiment, an apparatus for accessing video content collected by a home automation system includes a processor, a memory in electronic communication with the processor, and instructions stored in the memory which are executable by a processor to receive metadata about a recorded event from a cloud storage, request video content of the recorded event based on the metadata, and receive at least some of the video content from a controller of the home automation system.

In one example, the instructions may be executable by the processor to receive at least some of the video content from the cloud storage. The instructions may be executable by the processor to request video content directly from the controller. The instructions may be executable by the processor to receive video content from the controller via the cloud storage. The metadata may include information about a plurality of events video recorded by a camera of the home automation system. The mobile computing device may include a video retrieval module configured to determine a stored location for the video content based on the metadata. Requesting video content of the recorded event based on the metadata may include instructing the cloud storage to retrieve at least some of the video content from the controller. Requesting video content of the recorded event based on the metadata may include instructing the controller to retrieve at least some of the video content from the cloud storage.

Another embodiment is directed to a computer-program product for accessing with a mobile computing device video content collected by a home automation system, The computer-program product includes a non-transitory computer-readable medium storing instructions executable by a processor to receive from a cloud storage metadata about at least one event video recorded by a camera of the home automation system, request video content related to the at least one event based on the metadata, and receive at least some of the video content from a controller of the home automation system.

In one example, the instructions may be executable by the processor to receive at least some of the video content from the cloud storage. Requesting video content related to the at least one event may include transmitting instructions to at least one of the cloud storage and the controller to deliver the video content. The at least one event may include at least one of an alarm event, opening or closing of a building barrier, or entry of a security code.

A further embodiment is directed to a computer-implemented method for storing video content collected by a home automation system. The method includes receiving video content from at least one camera, generating metadata related to the video content, determining which portion of the video content to store remotely in a cloud storage and which portion to store in a local database, delivering a portion of the video content and the metadata to the cloud storage, and storing a remaining portion of the video content in the local database.

In one example, storing the remaining portion of the video content locally may include storing the remaining portion in a local database of at least one control panel of the home automation system. Generating metadata may include identifying at least one of a time, date, location, and type of event associated with the video content. The type of event may include an alarm event. The home automation system may include at least one controller operable to determine which portion of the video content to store remotely in a cloud storage and which portion to store in a local database.

A further embodiment is directed to an apparatus for storing video content collected by a home automation system. The apparatus includes a processor, a memory in electronic communication with the processor, and instructions stored in the memory. The instructions are executable by the processor to receive at a controller of the home automation system video content from at least one camera of the home automation system, collect metadata from the home automation system related to the video content, deliver a select portion of the video content and the metadata remotely to a cloud storage, and store at least some of a remaining portion of the video content locally.

According to one example, the controller may store the remaining portion of the video content in a local database. The instructions may be executable by the processor to store at least some of the remaining portion of the video content on at least one control panel of the home automation system.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
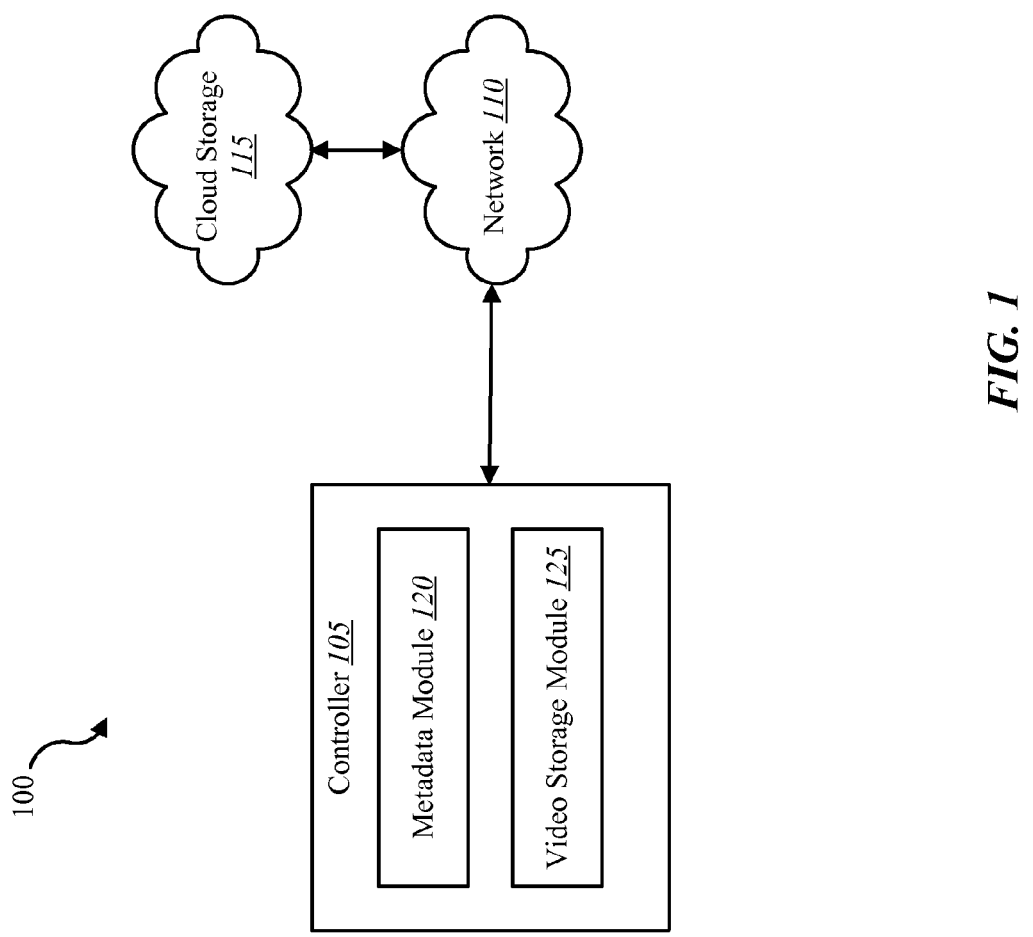
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to storing and accessing video content collected by a home automation system. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used indoor or outdoor.

In many home automation systems, it is typical for video content collected by one or more cameras to be stored exclusively either locally or remotely. Local storage may include storage in memory or a database of the home automation system on the property being monitored by the home automation system. The database may be included as part of a camera device, control panel, desktop computer, or other electronic device on the premises of the property. Local storage may also include control panels or other electronic devices in close proximity to the property being monitored by the home automation system (e.g., control panels at homes in the same neighborhood or within a local network of home automation systems). A remote location/storage may include, for example, cloud storage, a control station, or a backend support system (e.g., server). Storing data to a remote storage may have limitations related to data transmission speeds and undesirable band width occupation during transmission.

Metadata may be created for and associated with the video content generated by one or more cameras of the home automation system. The metadata may include information related to the video content such as, for example, time of day, day of week, an event, or other conditions and parameters. One aspect of the present disclosure relates to storage of the metadata and accessing the metadata. The metadata may be stored and made accessible separate from storage and access of the video content. Typically, the metadata requires significantly less storage space than does the video content to which the metadata applies. As such, the metadata is typically transmitted, stored and accessed more quickly and more easily than the transmission, storage and accessing of the associated video content.

In one embodiment, the metadata associated with a particular video content may be stored remotely such as, for example, in a cloud storage. At least some of the video content associated with the metadata may be stored locally or at some other location besides the cloud storage where the metadata is stored. A user may access the stored video content by first receiving and evaluating the metadata. The metadata may be received at, for example, a mobile computing device such as, for example, a smart phone or tablet computer. The mobile computing device may operate a video retrieval app or module. The user may decide, based at least in part on the received metadata, which portion of the video content is desired for viewing. The video content may then be retrieved from, for example, the local storage (e.g., a database housed at a control panel or camera of the property being monitored by the home automation system) or remotely at, for example, the cloud storage. The video content is then made available to the user for viewing.

Many scenarios are possible for retrieving the video content. In one example, the module or app on the mobile computing device carried by the user may request portions of the video content from various locations such as, for example, the cloud storage and/or the local storage of the home automation system (e.g., database of a control panel). The module or app of the mobile computing device may then assemble the video content and display it to the user. In another example, the module or app of the mobile computing device instructs a video retrieval module of the cloud storage, which identifies and/or assembles the video content from various storage locations and then facilitates delivery of the video content to the user's mobile computing device. In a still further example, the module or app of the user's mobile computing device instructs a controller (e.g., control panel) of the home automation system to identify, assemble, and/or retrieve the video content and facilitate delivery of the video content to the user's mobile computing app.

In a further example, the video retrieval module or app may be operated locally at a user interface (e.g., as part of a control panel) of the home automation system. The metadata is stored on the cloud storage and the video may be stored at any of a number of locations, including, for example, only a portion thereof on the cloud storage and other portions at other remote or local storage locations. The user may determine based on the retrieved metadata what portion of the video content is needed for viewing. The video retrieval module then provides instructions for and/or actively collects the desired video content for viewing by the user.

FIG. 1 is a block diagram illustrating one embodiment of an environment 100 in which the present systems and methods may be implemented. In some embodiments, the systems and methods described herein may be performed, at least in part, using a controller 105. Controller 105 may be in communication with a cloud storage 115 via a network 110. Controller 105 may include metadata module 120 and video storage module 125. Controller 105 may receive video content and generate metadata for the video content via the metadata module 120. Video storage module 125 may determine based at least in part on the metadata where to store the video content. In one example, the metadata and at least some of the video content is stored on the cloud storage 115. Remaining portions of the video content may be stored at other locations such as locally on a database that is accessible by controller 105 or other memory or databases in a common network (e.g., neighborhood). A determination of what video content to store on cloud storage 115 as opposed to other storage options may be based at least in part on event information included in the metadata. Video content of certain types of events or having other criteria such as certain times of day, days of week, etc. may have higher priority than other video content. In at least one example, only the highest priority video content is stored on the cloud storage. The remaining lower priority video content is stored locally.

Environment 100 may be a home automation system which includes, for example, automation and/or security features and functionality. Controller 105 may be part of or associated with various components of a home automation system. For example, controller 105 may be part of or operated by a video camera, a control panel, a desktop computer, a tablet computing device or the like. The video content processed by controller 105 and evaluated by metadata module 120 and video storage module 125 may be received from any of a number of different sources including, for example, a video camera of the home automation system. In another example, the video content is received from other locations such as a remote home automation system or a video camera that is positioned remotely (e.g., a different property) from controller 105. The video camera may be in communication with controller 105 via network 110. Network 110 may include any of a plurality of different communication mediums. Network 110 provides communication via, for example, wired or wireless connections.

Figure 2:
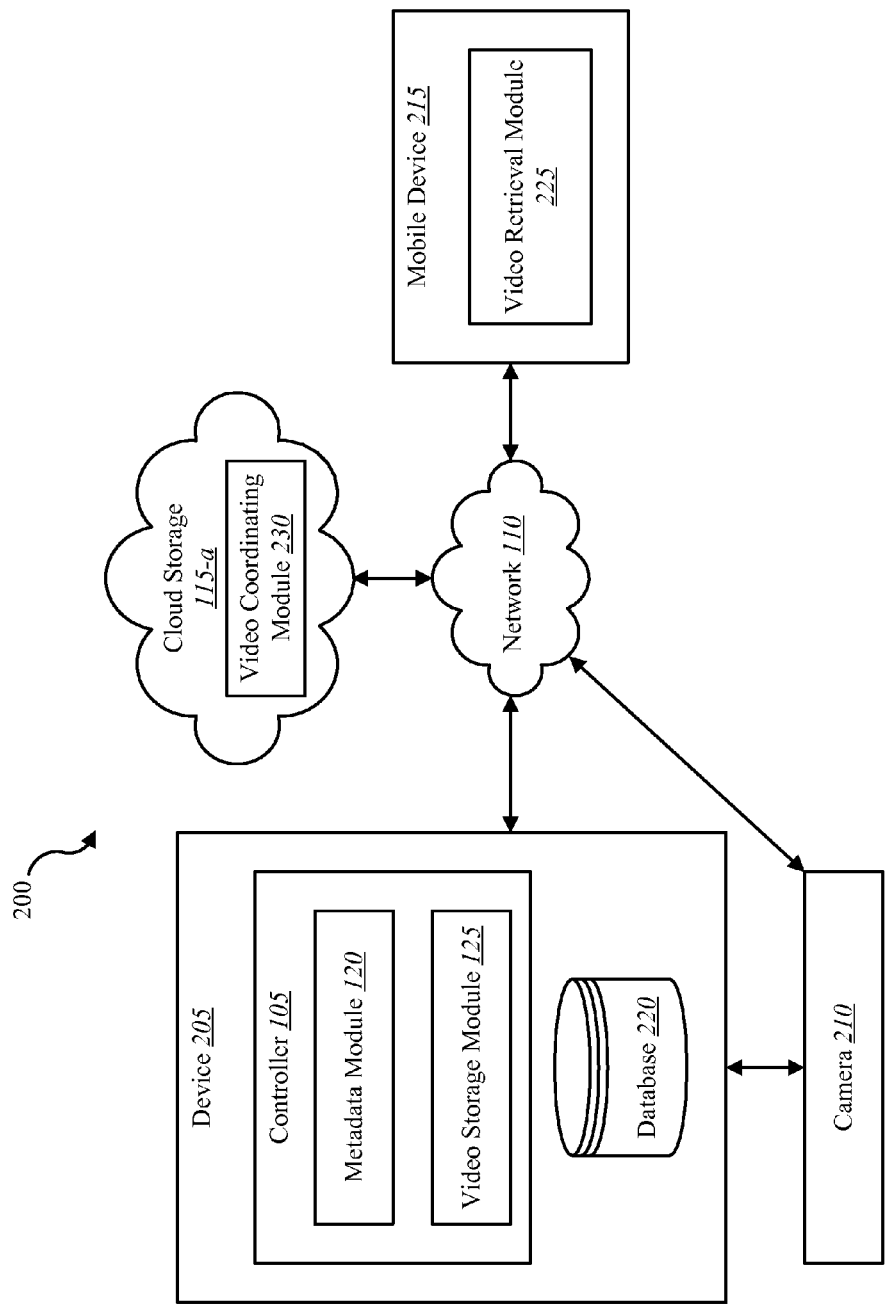
FIG. 2 is a block diagram of another environment in which the present systems and methods may be implemented.

FIG. 2 shows another environment 200 that may include the components of environment 100 described above, and may further include a device 205, a camera 210, and a mobile device 215. Device 205 may include the controller 105 described above with reference to FIG. 1. Device 205 may further include a database 220. Mobile device 215 may include a video retrieval module 225. A cloud storage 115-a may include a video coordinating module 230.

Network 110 may provide communication between device 205, cloud storage 115-a, camera 210, and mobile device 215. Network 110 may include local area networks (LAN), wide area networks (WAN), virtual private networks (VPN), wireless networks (using 802.11, for example), and/or cellular networks (using 3G and/or LTE, for example), etc. In some embodiments, the network 110 may include the Internet.

Camera 210 may provide video content to device 205. The video content may be evaluated by controller 105. Metadata module 120 may generate metadata associated with the video content from camera 210. Video storage module 125 may determine a storage location for the video content using, at least in part, the metadata generated by metadata module 120. At least some, if not all of the metadata may be stored on cloud storage 115-a. At least some of the video content may be stored in database 220. Additionally, or alternatively, other video content may be stored on cloud storage 115-a.

Mobile device 215 may include one or more processors, one or more memory devices, and/or a storage device. Although mobile device 215 is envisioned as a handheld computing device such as a smart phone, other types of mobile devices 215 may be possible including, for example, DVRs, personal video recorders (PVRs), personal computing devices, servers, etc.

Mobile device 215 may be used by an operator to access the stored video content. Mobile device 215 may receive metadata from cloud storage 115-a. Video retrieval module 225 may determine what video content is needed in view of the received metadata. In at least some examples, the operator may select among a variety of options available from the metadata to specify the portion of video content desired for viewing. Video retrieval module 225 may operate to retrieve the video content from wherever it is stored. The metadata may include information about where the video content is stored. In at least one example, video retrieval module 225 receives video content from database 220. In other examples, video retrieval module 225 may receive at least some video content from cloud storage 115-a. Video retrieval module 225 may also be operable to match the metadata with the received video content. Video retrieval module 225 may also assimilate the video content received from various locations (e.g., database 220 and/or cloud storage 115-a). Video retrieval module 225 or other components of mobile device 215 may then display the video content to the operator.

In other examples, video retrieval module 225 may provide instructions to one or both of device 205 and cloud storage 115-a to retrieve the desired video content and deliver the video content to mobile device 215. In still further examples, video retrieval module 225 instructs cloud storage 115-a to retrieve the requested video content and provide the video content (e.g., deliver or instruct to deliver) the video content to mobile device 215. The video coordinating module 230 of cloud storage 115-a may coordinate retrieval of the video content and, in some scenarios, may match the retrieved video content with the metadata. Video coordinating module 230 may provide at least the video content and/or the matched metadata and video content to mobile device 215. Video coordinating module 230 may be included in the cloud storage of any of the environments discloses herein.

Figure 3:
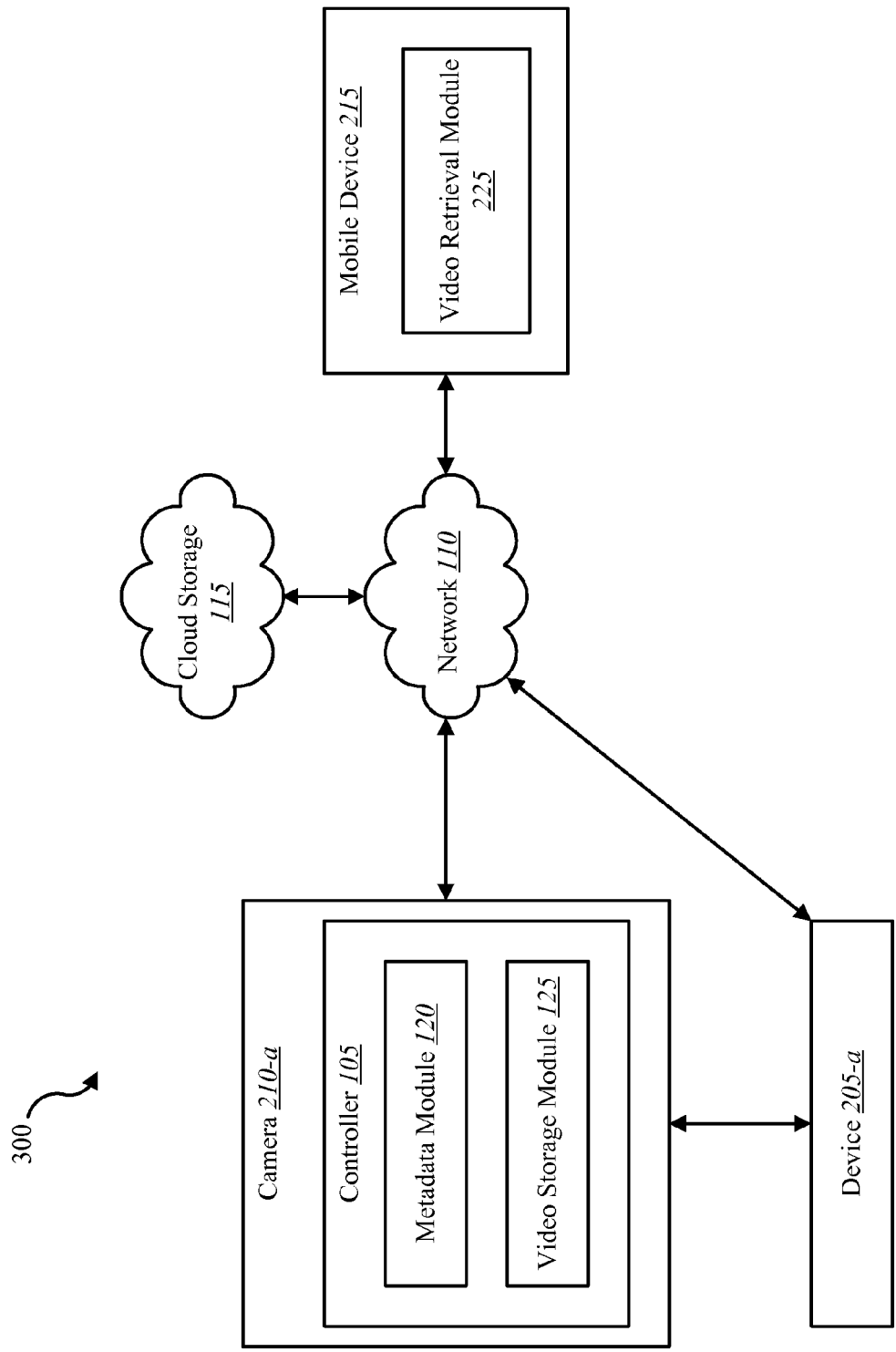
FIG. 3 is a block diagram of another environment in which the present systems and methods may be implemented.

Referring now to FIG. 3, in some embodiments, an environment 300 may include at least some of the components of environments 100, 200 described above and may further include a camera 210-a including the controller 105. A device 205-a may communicate with camera 210-a directly or via network 110. Mobile device 215 may communicate with cloud storage 115, camera 210-a and device 205-a via network 110.

As discussed above, controller 105 may generate and/or assign metadata to video content provided by camera 210-a using metadata module 120. Video storage module 125 may operate to determine where to store the video content such as, for example, in the cloud storage 115 and/or the device 205-a. Device 205-a may include or otherwise have access to a database (e.g., database 220 describe above with reference to FIG. 2) or other storage device located locally or remotely. In at least some examples, camera 210-a includes storage capacity (e.g., a database 220) for storage of at least some of the video content.

Device 205-a may provide information to controller 105 to assist in creating metadata via metadata module 120. For example, device 205-a may be part of a home automation system such as, for example, a control panel of a home automation system. Device 205-a may determine when an event occurs for which metadata should be generated. In one example, device 205-a identifies an alarm event and provides information related to the alarm event to controller 105. Camera 210-a may provide other information for generating metadata. In one example, camera 210-a may track date and time information that is used by metadata module 120 to create the metadata for video content being generated by camera 210-a. In some embodiments, some metadata may be automatically tagged to the video content upon its creation by camera 210-a.

Figure 4:
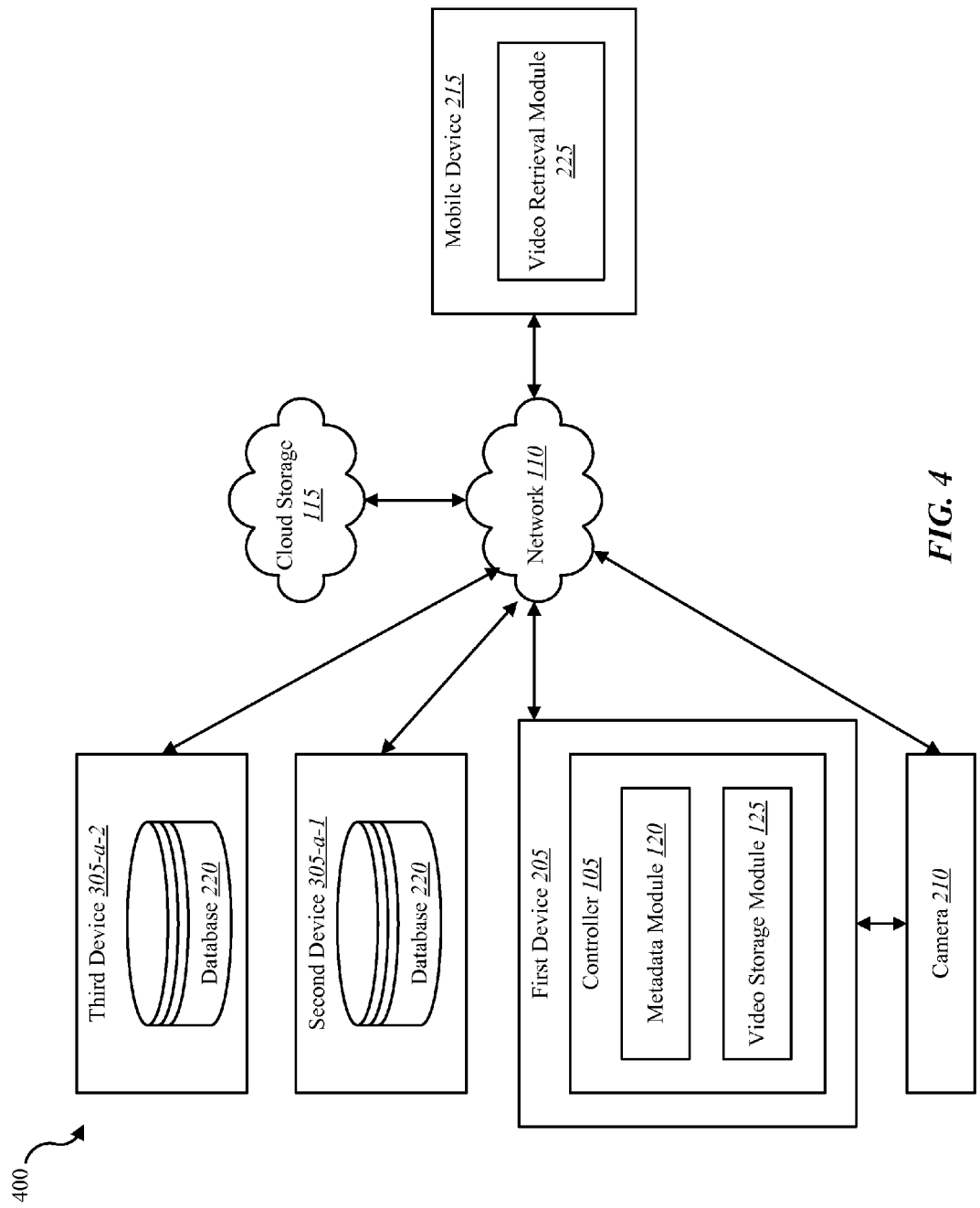
FIG. 4 is a block diagram of another environment in which the present systems and methods may be implemented.

FIG. 4 shows another example environment 400 that may include at least some of the components of environments 100, 200, 300 described above. Environment 400 may further include device 205 as a first device. First device 205 includes controller 105. Environment 400 may include additional devices such as a second device 305-a-1 and a third device 305-a-2. Each of the second and third devices 305 may include a database 220. First device 205 may also include a database 220 (e.g., see FIG. 2) or other data storage capability.

Video storage module 125 may operate to determine a storage location for any of the video content provided by camera 210. In one example, video storage module 125 may store all of the video content on first device 205 (e.g., a database 220 of first device 205, as shown in FIG. 2). In another example, all of the video content is stored in database 220 of second device 305-a-1. In a further example, all of the video content is stored in database 220 of third device 305-a-2. In further examples, the video content may be fragmented and stored in any one of the databases 220 on any one of the devices 205 and 305. Additionally, or alternatively, a portion of the video content may be stored in cloud storage 115.

The first device 205 may include or be part of, for example, a control panel of a home automation system. Second and third devices 305 may be additional control panels of the same home automation system for a single property. In other examples, second and third devices 305 may include or be part of one or more separate home automation systems for at least one other property. Second and third devices 305 may include or be part of a control panel of two separate home automation systems. Network 110 may provide communication between the first device 205 and the second and third devices 305. Second and third devices 305 may be located in relative close proximity to first device 205 (e.g., within a same neighborhood or other predefined geographic area).

The databases 220 may include or be part of a data storage device such as, for example, a hard disk drive or flash drive. The hard disk drives may be partitioned to include a portion thereof reserved for storage of data from other home automation systems and/or other devices 205, 305. Video storage module 125 may be capable of assessing the amount of storage space available at first device 205 and second and third devices 305, and then transfer video content to those devices and their associated databases based at least in part on the available storage space.

Retrieving the video content using, for example, video retrieval module 225 of mobile device 215 may include communicating with video storage module 125 to determine where the video content is stored, requesting a copy of the video content, and delivering the video content to mobile device 215. In other examples, the metadata stored in cloud storage 115 associated with the video content may provide information about where the video content is stored (e.g., on any of the first device 205, the second and third devices 305, and the cloud storage 115).

Figure 5:
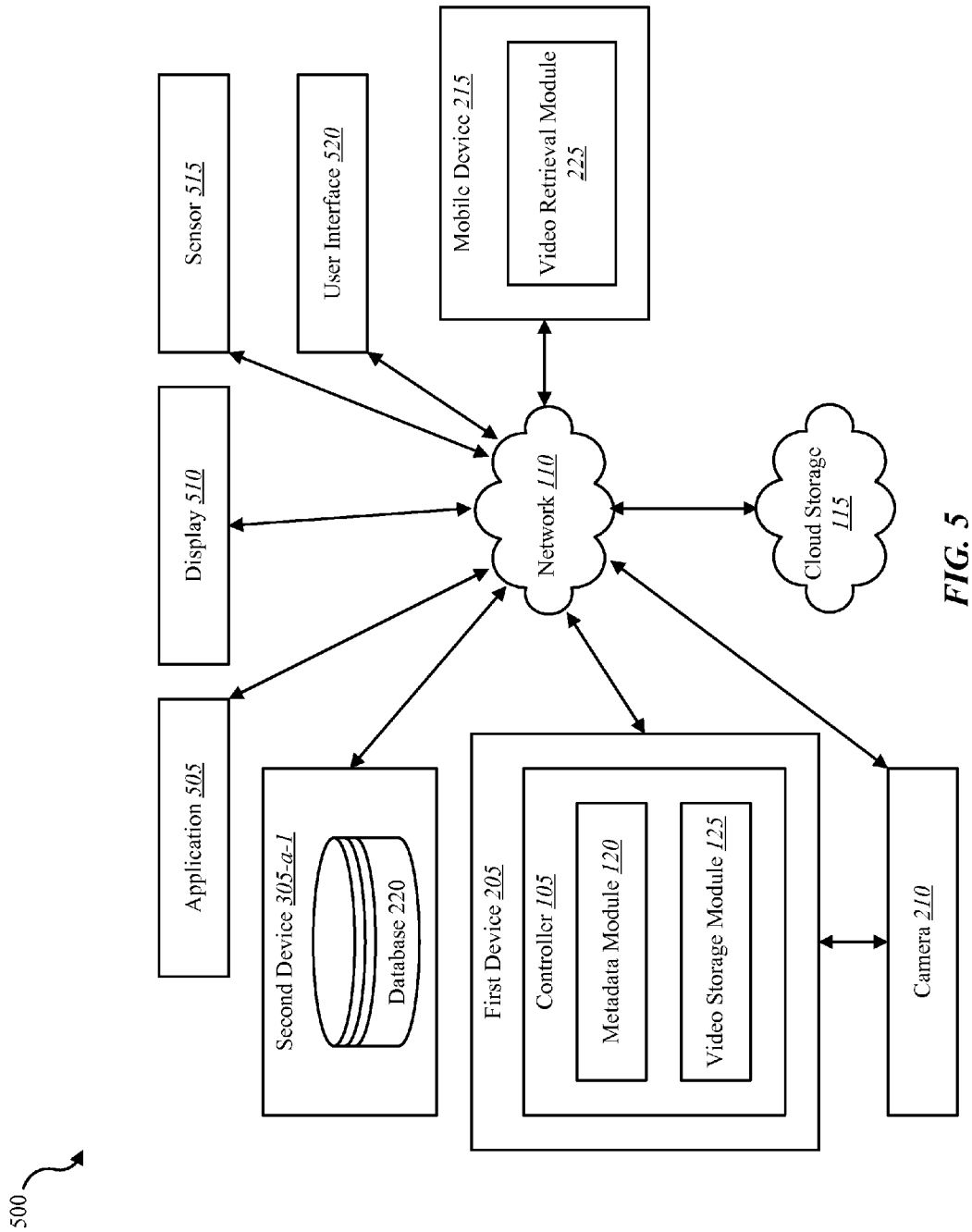
FIG. 5 is a block diagram of another environment in which the present systems and methods may be implemented.

Referring now to FIG. 5, in some embodiments an environment 500 may include the components of any one of environments 100, 200, 300, 400 described above. Environment 500 may additionally include application 505, display 510, sensor 515, and user interface 520. Environment 500 may include, from environment 400 described above, a first device 205, a camera 210, and a second device 305-a-1, as well as controller 105, network 110, cloud storage 115, and mobile device 215. Application 505, display 510, sensor 515, and user interface 520 may be additional components of a home automation system and may be used with any of the environments 100, 200, 300, 400 described above.

Application 505 may allow a user to control (either directly or via first device 205 or controller 105) an aspect of the monitored property including security, energy management, locking and unlocking doors, checking the status of a door, locating a user or item, controlling lighting, thermostat, cameras, receiving notification regarding a current status or anomaly associated with a home, office, place of business, and the like. In some configurations, application 505 may enable first device 205 to interface with controller 105 and provide the user interface 520 to display automation, security, and/or energy management content on first device 205 and/or mobile device 215. Thus, application 505, via user interface 520, may allow users to control aspects of their home, office, and/or other type of property. Further, application 505 may be installed on mobile device 215 in order to allow a user to interface with a function of device 205, controller 105, camera 210, etc.

Display 510 may include, for example, a digital display as part of, for example, a control panel of environment 500 (e.g., a home automation system). Display 510 may be provided via devices such as, for example, a desktop computer or mobile computing device (e.g., mobile device 215). The user interface 520 may be integrated into display 510. Such a user interface 520 may include a plurality of menus, screens, microphones, speakers, cameras, and other capabilities that permit interaction between the user and the home automation system or any components of environment 500. Additionally or alternatively, the user interface 520 with display 510 may be integrated into mobile device 215, first device 205, camera 210, or other devices of environment 500.

Sensor 515 may include, for example, a camera sensor, an audio sensor, a forced-entry sensor, a shock sensor, a proximity sensor, a boundary sensor, an appliance sensor, a light fixture sensor, a temperature sensor, a light beam sensor, a three dimensional (3D) sensor, a motion sensor, a smoke sensor, a glass break sensor, a door sensor, a window sensor, a carbon monoxide sensor, an accelerometer, a global positioning system (GPS) sensor, a Wi-Fi positioning sensor, a capacitance sensor, a radio frequency sensor, a near-field sensor, a heartbeat sensor, a breathing sensor, an oxygen sensor, a carbon dioxide sensor, a brain wave sensor, a movement sensor, a voice sensor, a touch sensor, and the like. The cameras may include video and still shot images and may be part of or integrated into camera 210. Camera 210 may include or have integrated therein one or more of the sensors 515.

Although sensor 515 is depicted as connected to first device 205, second device 305-*a*-1, camera 210, mobile device 215, and cloud storage 115 via network 110, in some embodiments, sensor 515 may be connected directly to any one of those components. Additionally, or alternatively, sensor 515 may be integrated into a home appliance or fixture such as a light bulb fixture. Sensor 515 may include an accelerometer to enable sensor 515 to detect movement of a user. Sensor 515 may include a wireless communication device, which enables sensor 515 to send and receive data to and from one or more devices in environment 500. Additionally, or alternatively, sensor 515 may include a GPS sensor to enable sensor 515 to track the location of sensor 515. Sensor 515 may include a proximity sensor to enable sensor 515 to detect proximity of a user relative to a predetermined distance from a boundary (e.g., geo fence). Sensor 515 may include one or more security detection sensors such as, for example, the glass break sensor, motion detection sensor, or both described above. Additionally, or alternatively, sensor 515 may be operable to detect the presence of a user within a dwelling or in close proximity to a dwelling that is monitored by the home automation system, perform certain functions (e.g. opening or closing a door or window), or speaking a voice command. The information provided by sensor 515 may be used to generate metadata via metadata module 120 for the video content generated by camera 210.

In any of the environments 100, 200, 300, 400, 500 described herein, the metadata and at least some of the video content may immediately be stored in the cloud storage while the remaining video content is stored in other storage locations. The video content stored on the cloud storage may relate to a specific type of event that occurred at the home automation system. In one example, the event is an unauthorized entry into a home (e.g., determined by, for example, a glass break sensor, door opening sensor, motion detection sensor, etc.). At least some of the video content collected in and/or around the home (e.g., in a room where sensors indicate the unauthorized entry occurred) just prior to, during, and/or after the entry is immediately transferred to cloud storage or some other remote storage location to preserve the video content in the event someone (e.g., a burglar) intentionally damages the camera, control panel, or other device that houses the controller (e.g., controller 105) and/or original video content. In at least some embodiments, the possible events that occur at a property and are identifiable by the home automation system may be rated with a priority value. When high priority events occur, the metadata and a portion of the video content may be automatically stored remotely (e.g., on the cloud storage), while low priority events may have only the metadata stored remotely.

The metadata and at least portions of the video content may be transmitted to the cloud storage at specific times and/or on particular days in order to most efficiently transmit the data. For example, all metadata and at least some high priority video content collected between 8:00 a.m. and 6:00 p.m. may be temporarily stored locally and then transmitted to the cloud storage during other hours (e.g., 12:00 a.m. to 4:00 a.m.) when there is improved transmission bandwidth. In another example, the metadata is automatically transmitted to the cloud storage immediately and any video content has a delayed transmission to times of improved transmission bandwidth.

Figure 6:
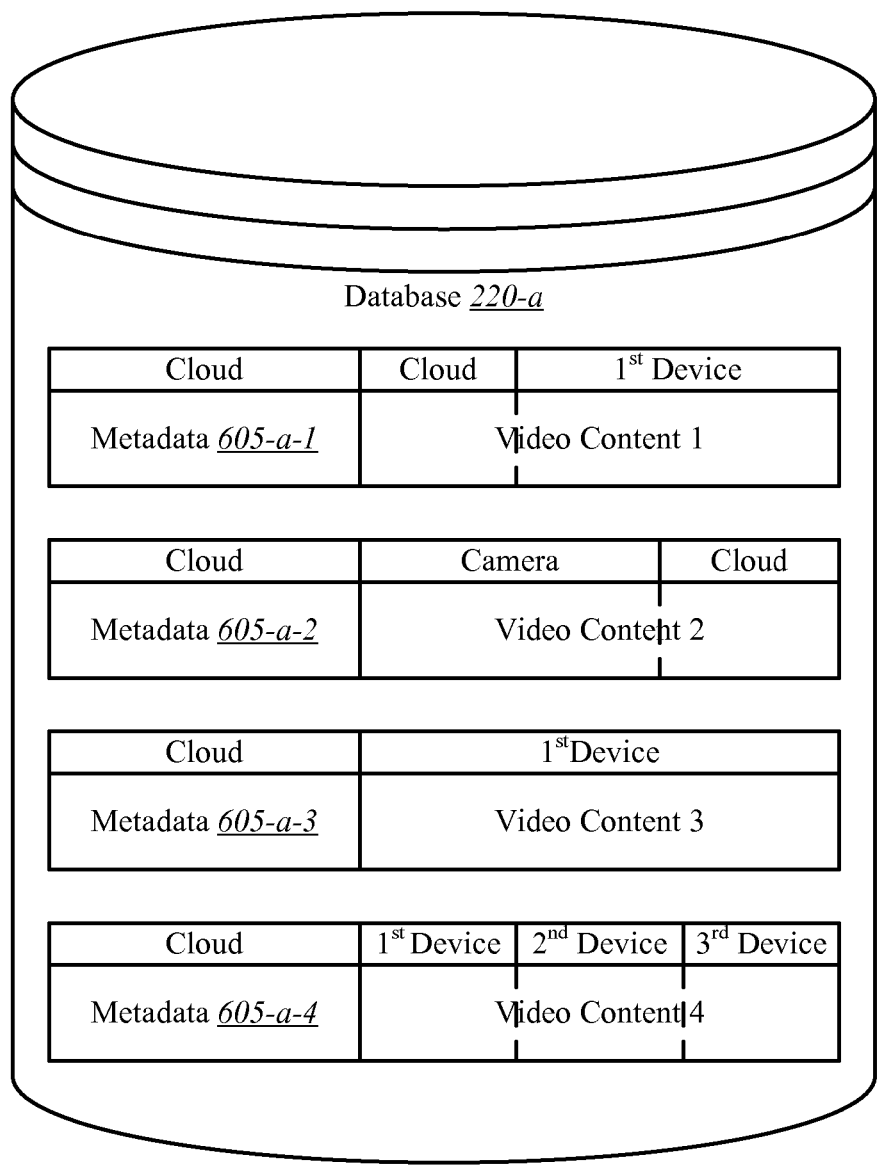
FIG. 6 is a block diagram of a database for use in at least one of the environments shown in FIG. 1-5.

Referring now to FIG. 6, a database 220-*a* is shown, which may be one example of the databases 220 shown in any of FIGS. 2, 4, and 5. Database 220-*a* stores video content 1-4. The video content 1-4 has metadata 605-*a*-1-4, respectively, associated therewith. The metadata 605 may be stored in the cloud (e.g., cloud storage 115). The video content may be divided into separate portions and stored at different locations. For example, video content 1 has a portion thereof stored in the cloud (e.g., cloud storage 115) and a portion thereof stored in a first storage device (e.g., first device 205). Video content 2 has a portion thereof stored in a camera (e.g., camera 210) and a portion thereof stored in the cloud. Video content 3 is stored in its entirety in the first storage device. Video content 4 has a portion thereof stored in the first storage device, a portion thereof stored in a second storage device (e.g., second device 305-*a*-1) and a portion thereof stored in a third storage device (e.g., third device 305-*a*-2).

The metadata 605 may include information about not only what is in the video content (e.g., an event, time of day, day of week, etc.) but also where the video content is stored (e.g., cloud, first device, camera, etc.). Database 220-*a* may represent any one of or a combination of the databases or other data storage devices described herein for storing video content.

Figure 7:
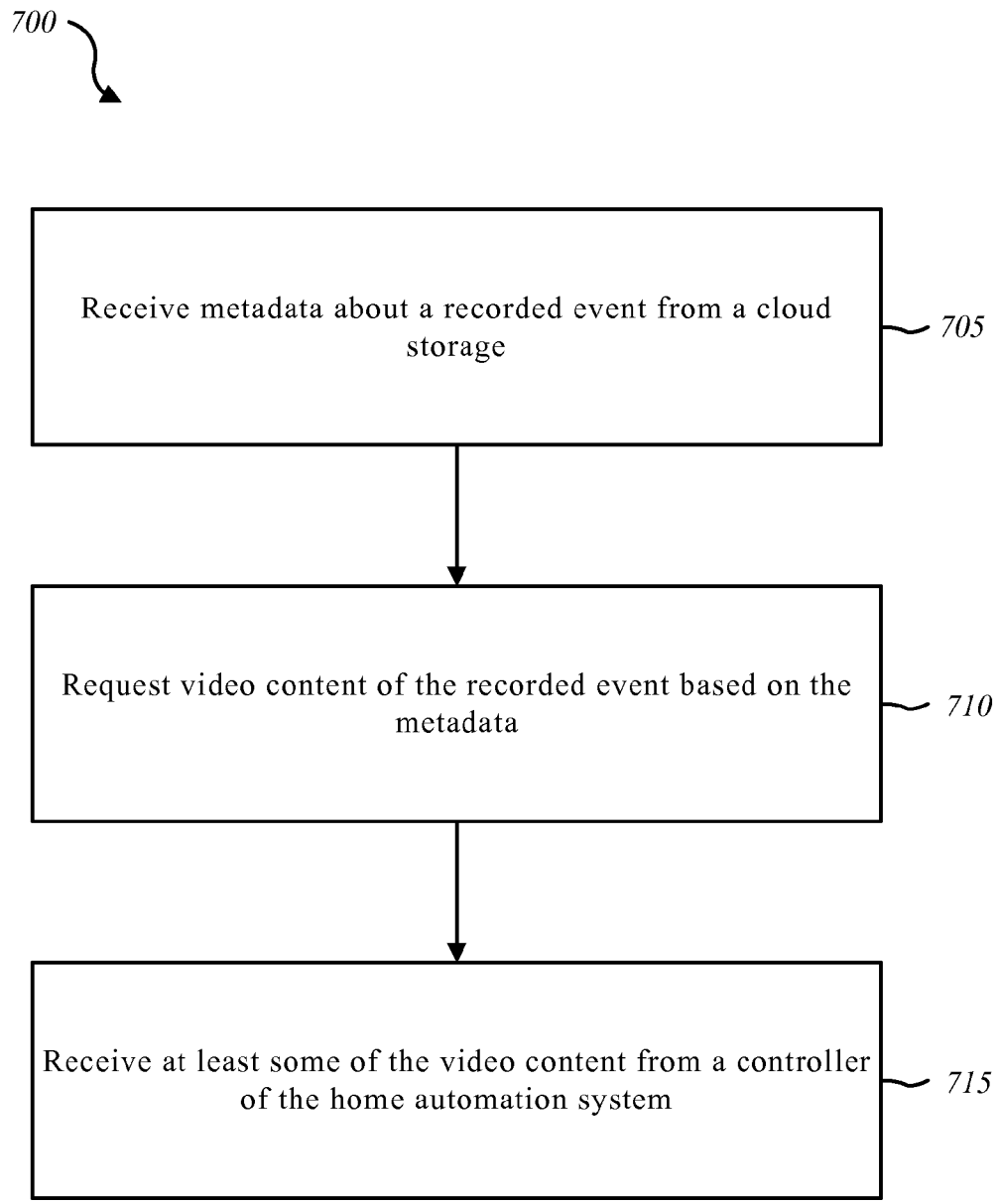
FIG. 7 is a flow diagram illustrating a method for accessing video content collected by a home automation system.

FIG. 7 is a flow diagram illustrating one embodiment of a method 700 for accessing video content collected by a home automation system using a mobile computing device. In some configurations, the method 700 may be implemented with any one or a combination of the metadata module 120, video storage module 125, video retrieval module 225, or video coordinating module 230 shown in FIGS. 1, 2, 3, 4, and/or 5. In other examples, method 700 may be performed generally by controller 105 shown in FIGS. 1-5, or even more generally by the environments 100, 200, 300, 400, 500 shown in FIGS. 1-5.

At block 705, method 700 includes receiving metadata about a recorded event from a cloud storage. At block 710, the method 700 includes requesting video content of the recorded event based on the metadata. At block 715, the method 700 includes receiving at least some of the video content from a controller of the home automation system.

Method 700 may further include receiving at least some of the video content from the cloud storage. Method 700 may include requesting video content directly from the controller. Method 700 may include receiving video content from the controller via the cloud storage. The metadata may include information about a plurality of events video recorded by a camera of the home automation system. The mobile computing device may include a video retrieval module configured to determine a storage location of the video content based on the metadata. Requesting video content of the recorded event based on the metadata may include instructing the cloud storage to retrieve at least some of the video content from the controller. Requesting video content of the recorded event based on the metadata may include instructing the controller to retrieve at least some of the video content from the cloud storage.

Figure 8:
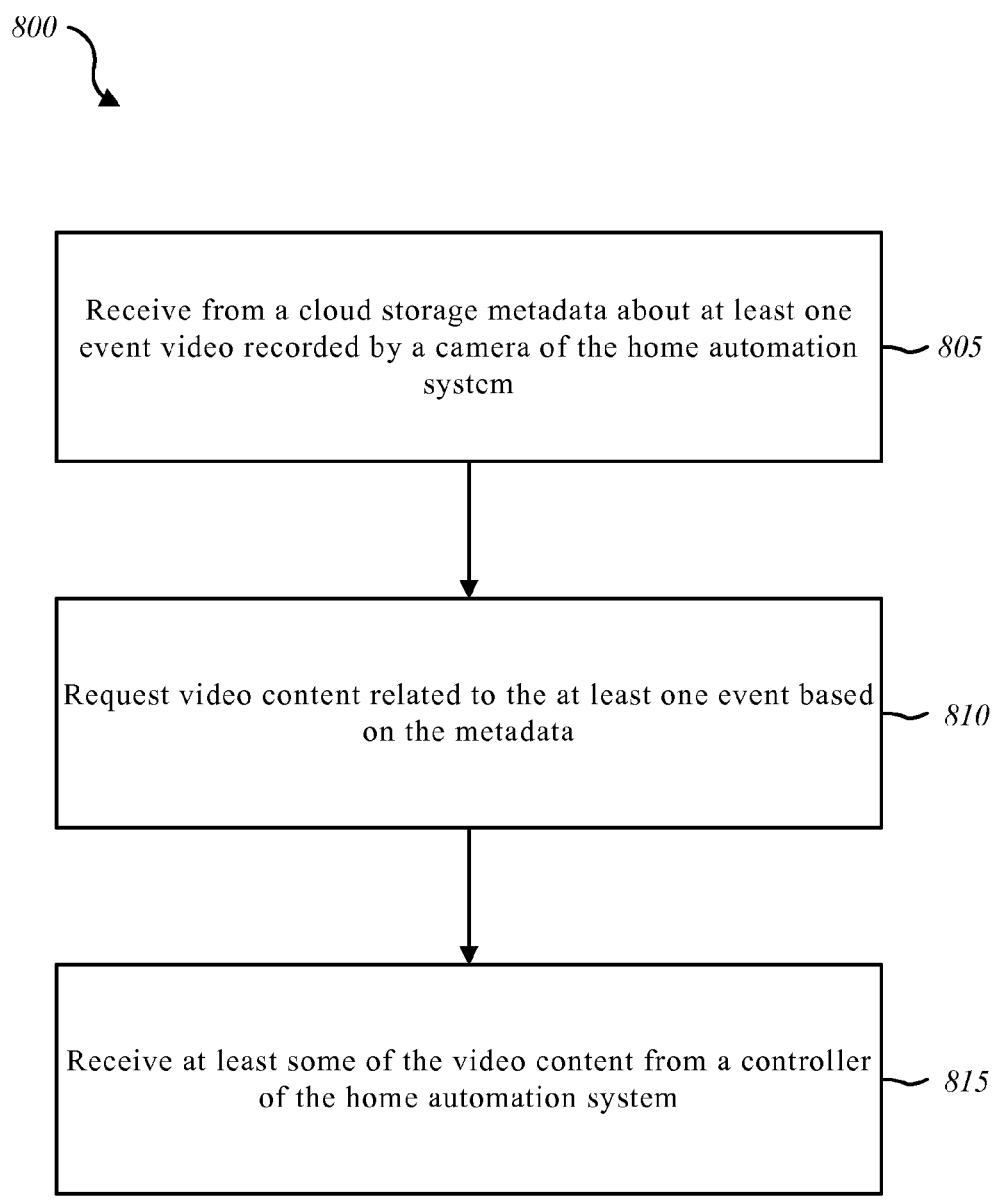
FIG. 8 is a flow diagram illustrating another method for accessing video content collected by a home automation system.

FIG. 8 is a flow diagram illustrating one example of a method 800 for accessing video content collected by a home automation system using a mobile computing device. In some configurations, the method 800 may be implemented by one or a combination of the metadata module 120, video storage module 125, video retrieval module 225, and video coordinating module 230 shown in FIGS. 1-5. In other examples, method 800 may be performed generally by any one or a combination of device 205, camera 210, cloud storage 115, or mobile device 215 shown in FIGS. 1-5. In other examples, method 800 may be performed even more generally by the environments 100, 200, 300, 400, 500 shown in FIGS. 1-5.

At block 805, method 800 includes receiving from a cloud storage metadata about at least one event video recorded by a camera of the home automation system. Block 810 includes requesting video content related to the at least one event based on the metadata. At block 815, the method 800 includes receiving at least some of the video content from a controller of the home automation system.

Method 800 may also include receiving at least some of the video content from the cloud storage. Requesting video content related to the at least one event may include transmitting instructions to at least one of the cloud storage and a controller to deliver the video content. The at least one event may include at least one of an alarm event, opening or closing of a building barrier, or entry of a security code.

Figure 9:
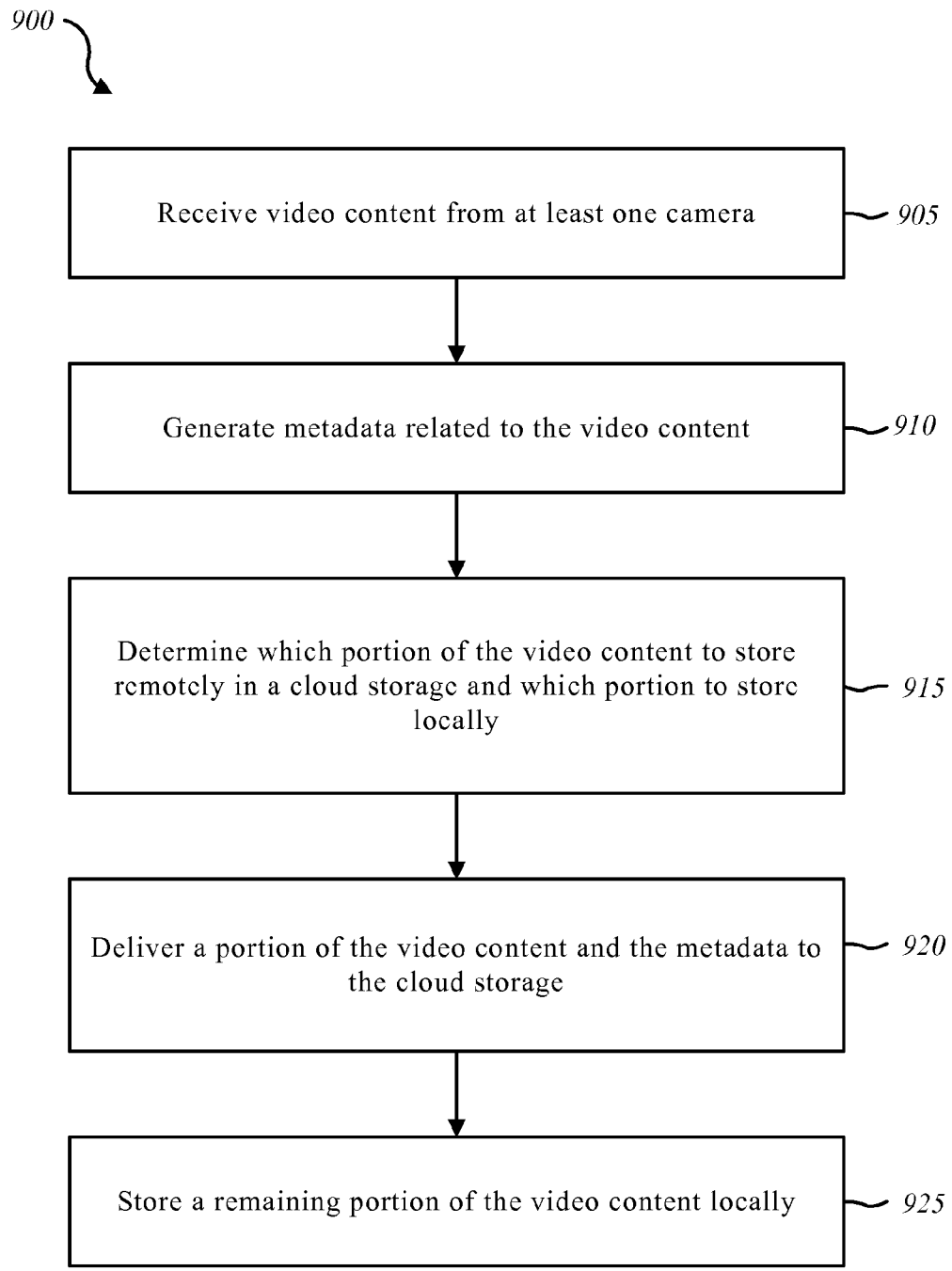
FIG. 9 is a flow diagram illustrating another method for accessing video content collected by a home automation system.

FIG. 9 is a flow diagram illustrating one embodiment of a method 900 for storing video content collected by a home automation system. In some configurations, the method 900 may be implemented by any one or a combination of the metadata module 120, video storage module 125, video retrieval module 225, and video coordinating module 230 described with reference to FIGS. 1-5. In other examples, method 900 may be performed generally by any one or a combination of camera 210, device 205, cloud storage 115, or mobile device 215 shown in FIGS. 1-5, or even more generally by the environments 100, 200, 300, 400, 500 shown in FIGS. 1-5.

At block 905, method 900 includes receiving video content from at least one camera. Block 910 includes generating metadata relating to the video content. Block 915 includes determining which portion of the video content to store remotely in a cloud storage and which portion to store locally. At block 920, method 900 includes delivering a portion of the video content and the metadata to the cloud storage. Block 925 includes storing a remaining portion of the video content locally.

Storing the remaining portion of the video content locally according to method 900 may include storing the remaining portion in a local database of at least one control panel of the home automation system. Generating metadata may include identifying at least one of a time, date, location, and type of event associated with the video content. The type of event may include an alarm event. The home automation system may include at least one controller operable to determine which portion of the video content to store remotely in a cloud storage or other remote storage device, and which portion to store in a local database or storage device.

Figure 10:
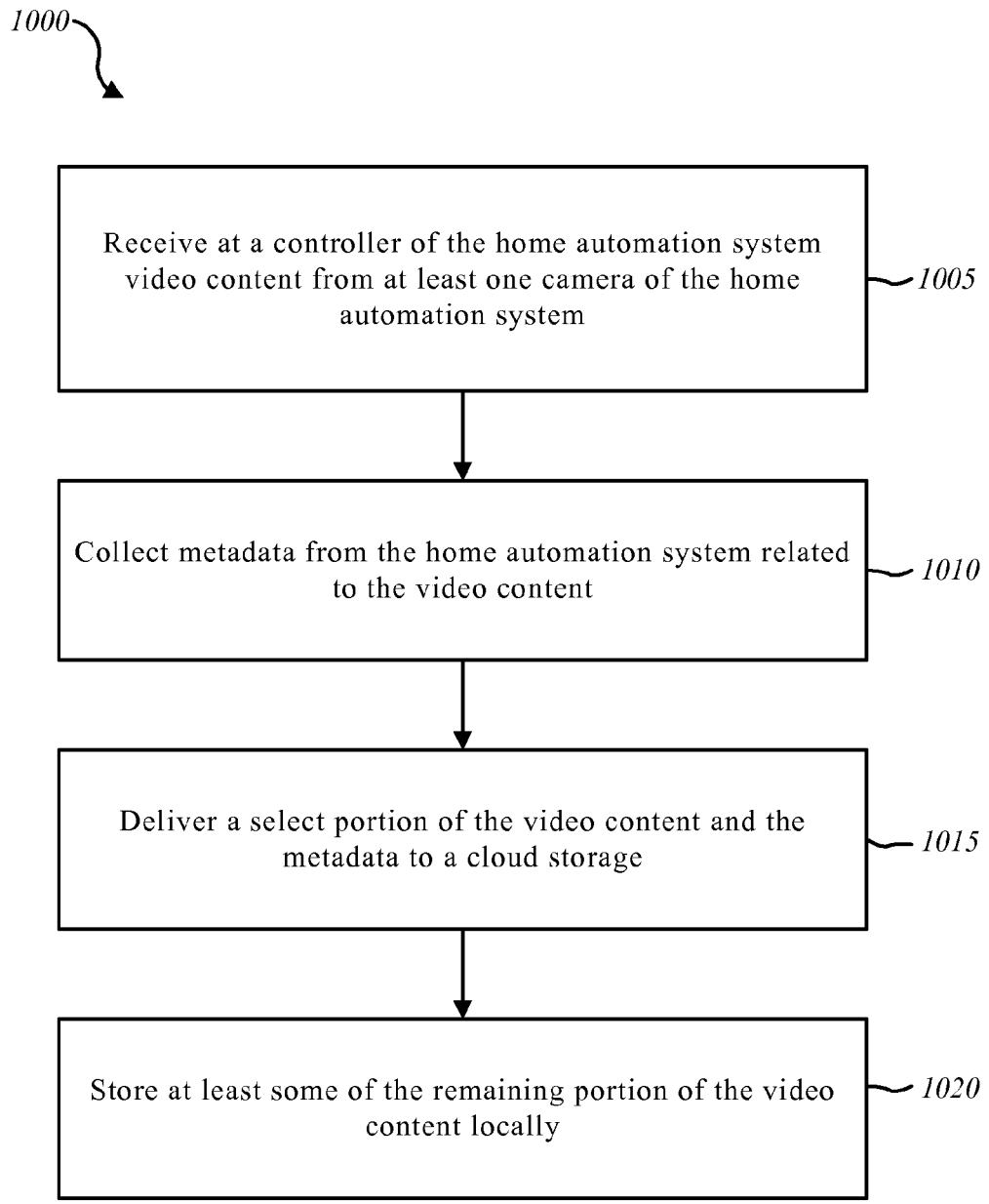
FIG. 10 is a flow diagram illustrating another method for accessing video content collected by a home automation system.

FIG. 10 is a block diagram illustrating one example of a method 1000 for storing video content collected by a home automation system. In some configurations, the method 1000 may be implemented by any one or a combination of the metadata module 120, video storage module 125, video retrieval module 225, and video coordinating module 230 shown in FIGS. 1-5. In other examples, method 1000 may be performed generally by any one or a combination of the device 205, camera 210, cloud storage 115, and mobile device 215 shown in FIGS. 1-5, or even more generally by the environments 100, 200, 300, 400, 500 shown in FIGS. 1-5.

At block 1005, method 1000 includes receiving at a controller of the home automation system video content from at least one camera of the home automation system. Block 1010 includes collecting metadata from the home automation system related to the video content. Block 1015 includes delivering a select portion of the video content and the metadata to a cloud storage. Block 1020 includes storing at least some of the remaining portion of the video content locally.

The controller of method 1000 may store the remaining portion of the video content in a local database. Method 1000 may also include storing at least some of the remaining portion of the video content on at least one control panel of the home automation system.

Figure 11:
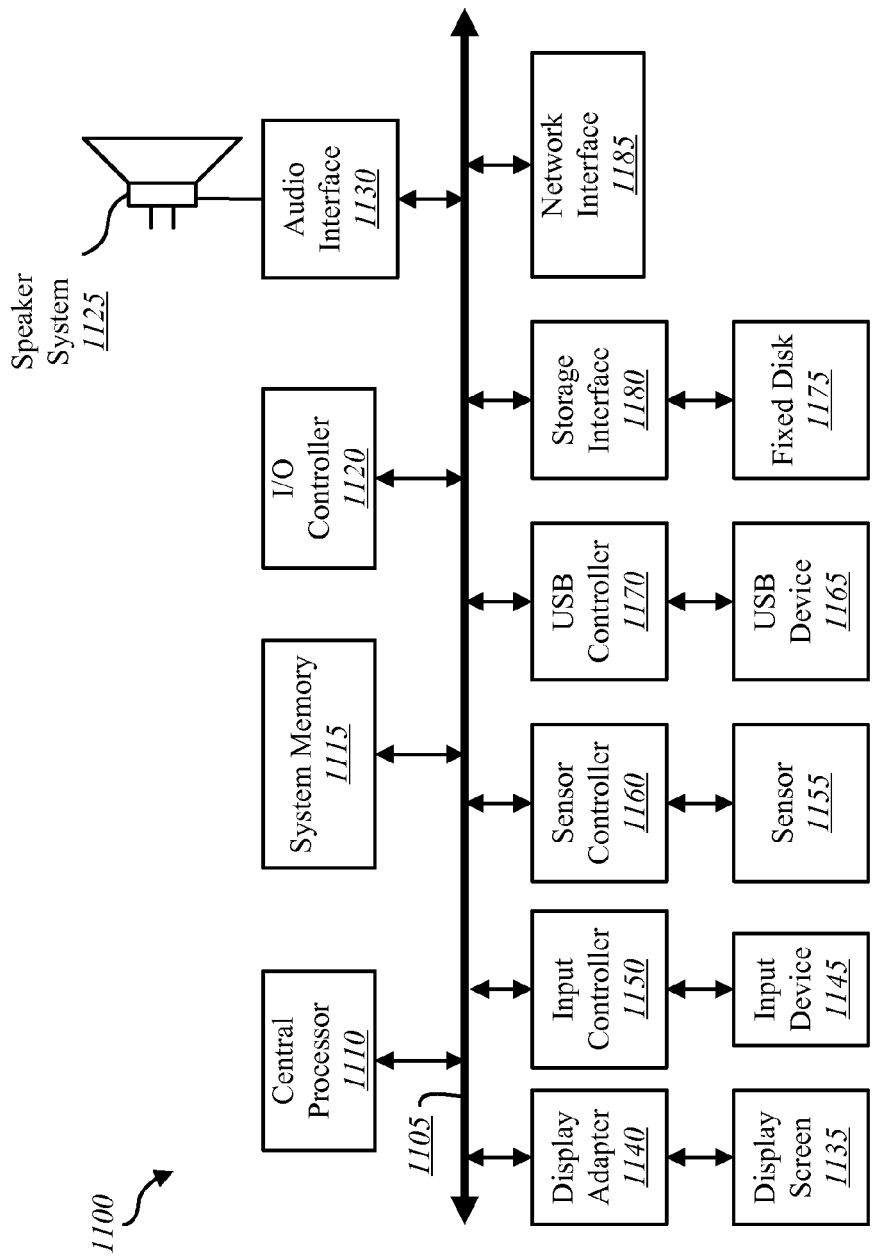
FIG. 11 is a block diagram of a computer system suitable for implementing the present systems and methods of FIGS. 1-10.

FIG. 11 depicts a block diagram of a controller 1100 suitable for implementing the present systems and methods. The controller 1100 may be an example of the controller 105 of device 205 and camera 210 illustrated in FIGS. 2, 3, 4 and/or 5, or the mobile device 215 or cloud storage 115 illustrated in FIGS. 2-5. In one configuration, controller 1100 includes a bus 1105 which interconnects major subsystems of controller 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), and a storage interface 1180. Also included are at least one sensor 1155 connected to bus 1105 through a sensor controller 1160 and a network interface 1185 (coupled directly to bus 1105).

Bus 1105 allows data communication between central processor 1110 (e.g., controller 105) and system memory 1115, which may include read-only memory (ROM) or flash memory (neither shown), and random access memory (RAM) (not shown), as previously noted. Any of the modules discloses with reference to FIGS. 1-5 may be stored in system memory 1115. The RAM is generally the main memory into which the operating system and application programs are loaded. The ROM or flash memory can contain, among other code, the Basic Input-Output system (BIOS) which controls basic hardware operation such as the interaction with peripheral components or devices. Applications (e.g., application 505) resident with controller 1100 are generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via interface 1185.

Storage interface 1180, as with the other storage interfaces of controller 1100, can connect to a standard computer readable medium for storage and/or retrieval of information, such as a fixed disk drive 1175. Fixed disk drive 1175 may be a part of controller 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1100 wirelessly via network interface 1185.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on controller 1100 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for accessing video content, comprising:
a processor of a mobile computing device;
a memory of the mobile computing device in electronic communication with the processor; and
instructions stored in the memory, the instructions being executable by the processor to:
receive, from a cloud storage, metadata about a recorded event occurring at a premises, the recorded event including metadata and video content recorded by a security camera at the premises, wherein the metadata is stored at a location distinct from the video content of the recorded event;
determine the stored location of the video content, the determination based at least in part on the received metadata;
select a portion of the video content based on review of the metadata, the selected portion of the video content including a first portion of the video content stored in the cloud storage and a second portion of the video content stored in a storage device local to the premises;

send a request to a controller of a home automation system for the selected portion of the video content of the recorded event; and receive the selected portion of the video content from the controller, the controller extracting the selected portion of the video content from the video content stored in the cloud storage and the video content stored in the storage device local to the premises.

2. The apparatus of claim 1, wherein the instructions are executable by the processor to:

request video content directly from the controller.

3. The apparatus of claim 1, wherein the instructions are executable by the processor to:

receive video content from the controller via the cloud storage.

4. The apparatus of claim 1, wherein the metadata includes information about a plurality of events video recorded by a camera of the home automation system.

5. The apparatus of claim 1, wherein requesting video content of the recorded event based on the metadata includes instructing the cloud storage to retrieve at least some of the video content from the controller.

6. The apparatus of claim 1, wherein requesting video content of the recorded event based on the metadata includes instructing the controller to retrieve at least some of the video content from the cloud storage.

7. A computer-program product for accessing video content collected by a home automation system, the computer-program product comprising a non-transitory computer-readable medium storing instructions executable by a processor of a mobile computing device to:

receive, from a cloud storage, metadata about a recorded event occurring at a premises, the recorded event including metadata and video content recorded by a security camera at the premises, wherein the metadata is stored at a location distinct from the video content of the recorded event;

determine the stored location of the video content, the determination based at least in part on the received metadata;

select a portion of the video content based on review of the metadata, the selected portion of the video content including a first portion of the video content stored in the cloud storage and a second portion of the video content stored in a storage device local to the premises;

send a request to a controller of a home automation system for the selected portion of the video content of the recorded event; and receive the selected portion of the video content from the controller, the controller extracting the selected portion of the video content from the video content stored in the cloud storage and the video content stored in the storage device local to the premises.

8. The computer-program product of claim 7, wherein requesting video content related to the at least one event includes transmitting instructions to at least one of the cloud storage and the controller to deliver the video content.

9. The computer-program product of claim 7, wherein the at least one event includes at least one of an alarm event, opening or closing of a building barrier, or entry of a security code.

10. A computer-implemented method for storing video content collected by a home automation system, comprising:

receiving, by a processor of a controller of the home automation system, video content from at least one camera of the home automation system;

generating, by the processor, metadata related to the video content,;

determining, by the processor, which portion of the video content to store remotely in a cloud storage and which portion to store in a local database;

delivering, by the processor, a portion of the video content and the metadata to the cloud storage, the metadata stored at a location distinct from the video content;

storing, by the processor, a remaining portion of the video content in the local database;

indicating, by the processor, the storage location of the video content within the generated metadata;

sending, by the processor, the metadata to a mobile computing device;

receiving, by the processor, a request from the mobile computing device for a selected portion of the video content, the selected portion of the video content including a first portion of the video content stored in the cloud storage and a second portion of the video content stored in the local database; and providing, to the mobile computing device by the processor, the selected portion of the video content from the video content stored on the cloud storage and the video content stored in the storage device local to the premises.

11. The method of claim 10, wherein storing the remaining portion of the video content locally includes storing the remaining portion in a local database of at least one control panel of the home automation system.

12. The method of claim 10, wherein generating metadata includes identifying at least one of a time, date, location, and type of event associated with the video content.

13. The method of claim 12, wherein the type of event includes an alarm event.

14. The method of claim 10, wherein the home automation system includes at least one controller operable to determine which portion of the video content to store remotely in a cloud storage and which portion to store in a local database.

15. An apparatus for storing video content collected by a home automation system, comprising:

a processor of a controller of the home automation system;

a memory of the controller in electronic communication with the processor; and instructions stored in the memory, the instructions being executable by the processor to:

receive at the controller of the home automation system video content from at least one camera of the home automation system;

collect metadata from the home automation system related to the video content;

deliver a portion of the video content and the metadata remotely to a cloud storage, the metadata stored at a location distinct from the video content;

store at least some of a remaining portion of the video content locally;

indicate the storage location of the video content within the collected metadata;

send the metadata to a mobile computing device;

receive, from the mobile computing device, a request for a selected portion of the video content, the selected portion of the video content including a first portion of the video content stored in the cloud storage and a second portion of the video content stored locally in a local database; and provide, to the mobile computing device, the selected portion of the video content from the video content stored on the cloud storage and the video content stored in the storage device local to the premises.

16. The apparatus of claim 15, wherein the controller stores the remaining portion of the video content in a local database.

17. The apparatus of claim 15, wherein the instructions are executable by the processor to:
store at least some of the remaining portion of the video content on at least one control panel of the home automation system.

* * * * *